United States Patent
Kobayashi et al.

(10) Patent No.: US 9,973,575 B2
(45) Date of Patent: May 15, 2018

(54) DISTRIBUTED PROCESSING SYSTEM AND CONTROL METHOD

(71) Applicant: FUJITSU LIMITED, Kawasaki-shi, Kanagawa (JP)

(72) Inventors: Kenji Kobayashi, Kawasaki (JP); Yusuke Koyanagi, Kawasaki (JP); Nobutaka Imamura, Yokohama (JP); Masazumi Matsubara, Machida (JP); Yoshinori Sakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 14/663,925

(22) Filed: Mar. 20, 2015

(65) Prior Publication Data

US 2015/0281345 A1    Oct. 1, 2015

(30) Foreign Application Priority Data

Mar. 31, 2014   (JP) .................................. 2014-072326

(51) Int. Cl.
*H04L 29/08* (2006.01)
*G06F 12/02* (2006.01)
*G06F 9/48* (2006.01)

(52) U.S. Cl.
CPC ........ *H04L 67/1008* (2013.01); *G06F 9/4856* (2013.01); *H04L 67/1031* (2013.01)

(58) Field of Classification Search
CPC ............ H04L 67/1008; H04L 67/1031; G06F 9/45533

(Continued)

(56) References Cited

U.S. PATENT DOCUMENTS 9,495,195 B2 * 11/2016 Terayama ............. G06F 9/5011
2009/0063556 A1 * 3/2009 Nemoto ............ G06F 17/30079

(Continued)

FOREIGN PATENT DOCUMENTS

JP         8-190537         7/1996
JP      2002-288148       10/2002

(Continued)

OTHER PUBLICATIONS

"Efficient Resource Allocation in Resource Provisioning Policies over Resource Cloud Communication Paradigm"—Raj et al, IJCCSA, vol. 2, No. 3, Jun. 2012 https://arxiv.org/ftp/arxiv/papers/1207/1207.2704.pdf.*

(Continued)

*Primary Examiner* — Randy Scott
(74) *Attorney, Agent, or Firm* — Staas & Halsey LLP

(57) ABSTRACT

A control method for controlling a distributed processing system that performs distributed processing using a plurality of devices is executed by a processor. The method including acquiring load information from each of the plurality of devices, identifying a source device and a destination device based on the acquired load information, the source device being a device of a migration source of an allocated processing operation and the destination device being a device of a migration destination of the allocated processing operation. The method further including selecting as a processing operation of a migration target from among a plurality of processing operations allocated to the source device, a processing operation with which a rate that data used by the processing operation at the source device is to be used at the destination device is relatively high or higher than a predetermined rate.

15 Claims, 13 Drawing Sheets

(58) Field of Classification Search
USPC .......................... 709/223, 224, 225, 226, 250
See application file for complete search history.

(56) References Cited

U.S. PATENT DOCUMENTS

| | | |
|---|---|---|
| 2009/0248871 A1 | 10/2009 | Takase et al. |
| 2012/0265882 A1* | 10/2012 | Hatasaki ............... G06F 9/5077 709/226 |
| 2013/0124674 A1* | 5/2013 | Matsumoto ........... G06F 3/0611 709/217 |
| 2013/0198471 A1 | 8/2013 | Tsuchiya et al. |
| 2013/0227127 A1* | 8/2013 | Takano ................. G06F 9/5044 709/224 |
| 2014/0115183 A1* | 4/2014 | Mitsunobu ............ H04L 47/621 709/232 |
| 2014/0229949 A1* | 8/2014 | Cai ..................... G06F 9/45533 718/1 |

FOREIGN PATENT DOCUMENTS

| | | |
|---|---|---|
| JP | 2005-250782 | 9/2005 |
| JP | 2009-237637 | 10/2009 |
| JP | 2011-197896 | 10/2011 |
| JP | 2012-8854 | 1/2012 |
| JP | 2013-156846 | 8/2013 |
| JP | 2013-534007 | 8/2013 |
| WO | 2011/159517 A2 | 12/2011 |

OTHER PUBLICATIONS

Japanese Office Action dated Nov. 28, 2017 in corresponding Japanese Patent Application No. 2014-072326.

* cited by examiner

FIG. 4

ENTIRE DATA MANAGEMENT UNIT ~22

| PROCESSING | PROCESSING NODE | OVERLAP RATE |
|---|---|---|
| PROCESSING 1 | NODE A | 100% |
| PROCESSING 1 | NODE B | 70% |
| PROCESSING 1 | NODE C | 44% |
| PROCESSING 2 | NODE A | 100% |
| ... | ... | ... |

OVERLAP-BETWEEN-PROCESSING-OPERATION-AND-NODE MANAGEMENT TABLE T4

| COMPARISON REFERENCE PROCESSING OPERATION | COMPARISON TARGET PROCESSING OPERATION | OVERLAP RATE |
|---|---|---|
| PROCESSING 1 | PROCESSING 2 | 90% |
| PROCESSING 1 | PROCESSING 3 | 40% |
| PROCESSING 1 | PROCESSING 4 | 34% |
| PROCESSING 2 | PROCESSING 3 | 52% |
| ... | ... | ... |

OVERLAPS-BETWEEN-ALL-PROCESSING-OPERATIONS MANAGEMENT TABLE T5

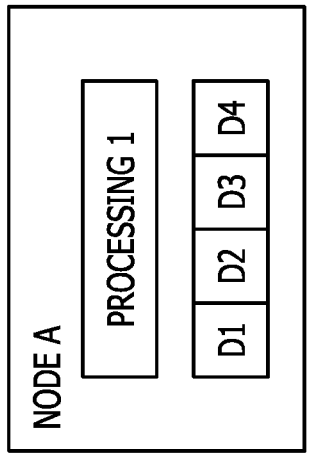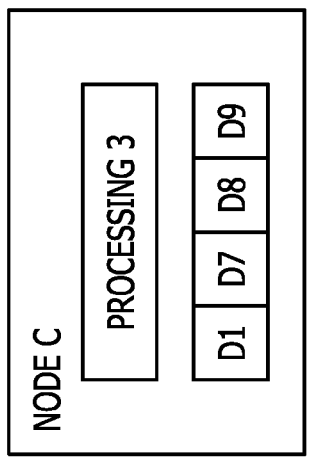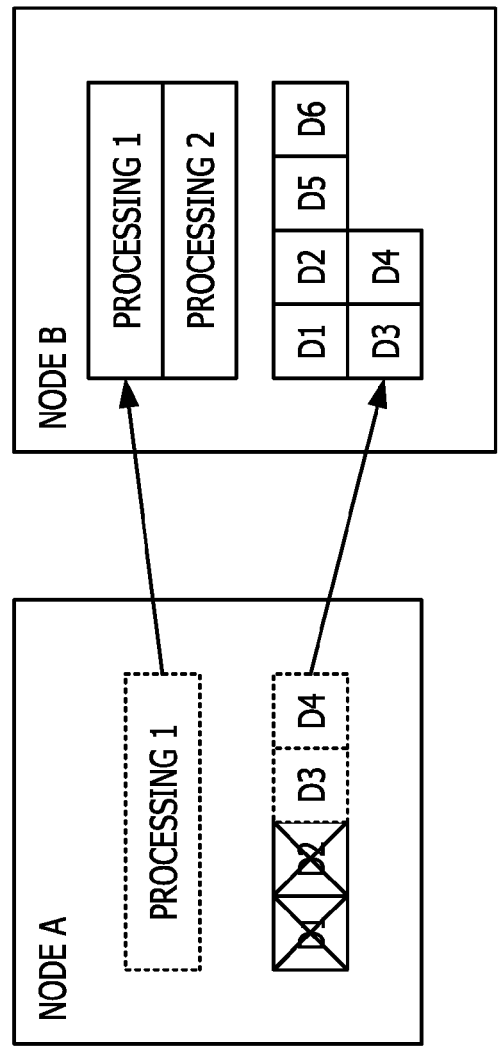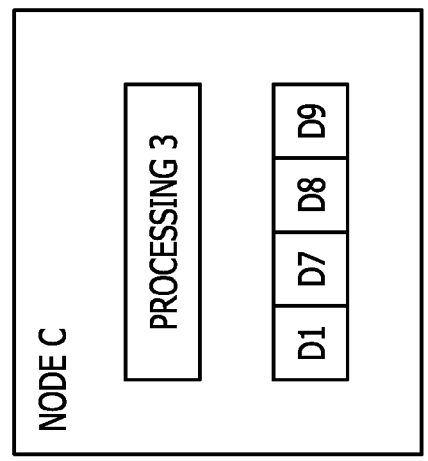
FIG. 5A
FIG. 5B

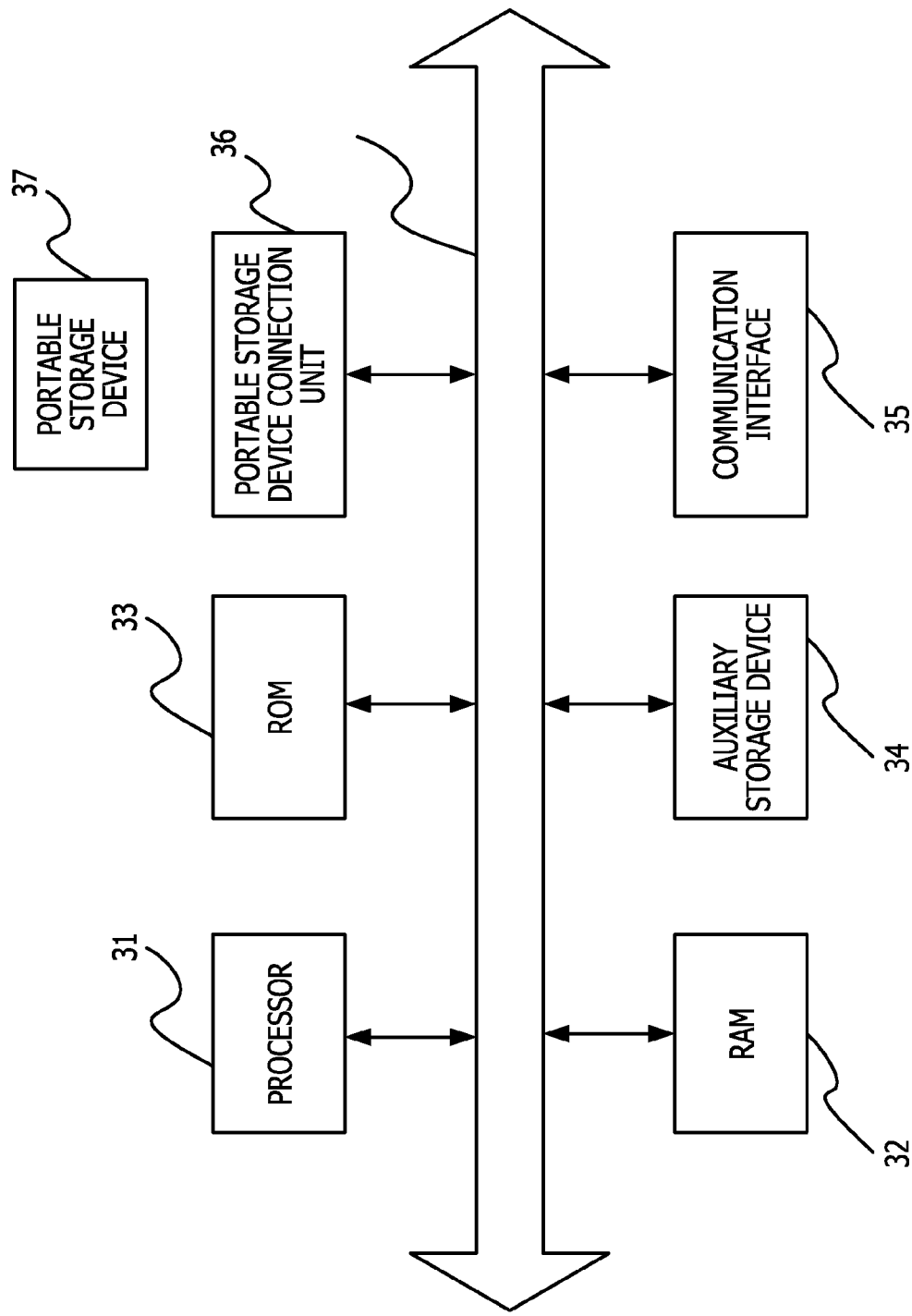

DISTRIBUTED PROCESSING SYSTEM AND CONTROL METHOD

CROSS-REFERENCE TO RELATED APPLICATION

This application is based upon and claims the benefit of priority of the prior Japanese Patent Application No. 2014-072326, filed on Mar. 31, 2014, the entire contents of which are incorporated herein by reference.

FIELD

The embodiments discussed herein are related to a distributed processing system and a control method for a distributed processing system.

BACKGROUND

There has been a technology in which a plurality of devices distribute and process a large amount of data. The large amount of data is put into a plurality of data blocks and distributed to individual devices. The individual devices store therein the distributed data blocks and process the stored data.

It is desirable that processing of data and storing of data to serve as a target of the processing are performed in a same device. If a device to store therein data and a device to perform processing on the data are different from each other, a remote access through a network turns out to be performed when the processing accesses the data.

If the processing performs the remote access on the data, an access through the network is performed, thereby reducing a processing speed. If the processing and the storing of the data are performed in a same device, an environment of a local access may be maintained, thereby suppressing a reduction in the processing speed.

If processing operations are executed in the individual devices, a same piece of data is redundantly stored in one device, in some cases. In this case, the amount of data stored in the device increases, and the usage amount of a resource (for example, a memory, a hard disk, or the like) of the device increases.

As a related art, there has been proposed a technology of a server to reduce the sum of loads due to content acquisition and for switching the connection destination of the server. In addition, there has been proposed a technology for detecting the load state of a server and handing over processing in a halfway state between servers. In addition, there has been proposed a technology in which an overlap amount of an XPath expression to newly add a condition for filtering XML data is calculated and a distribution server to be caused to process the added XPath expression is selected based on the total sum of the distribution amounts and the overlap amounts of registered XPath expressions.

As related art documents, there have been Japanese Laid-open Patent Publication No. 2009-237637, Japanese Laid-open Patent Publication No. 2002-288148, and Japanese Laid-open Patent Publication No. 2005-250782.

SUMMARY

According to an aspect of the invention, a control method for controlling a distributed processing system that performs distributed processing using a plurality of devices is executed by a processor. The method including acquiring load information from each of the plurality of devices, identifying a source device and a destination device based on the acquired load information, the source device being a device of a migration source of an allocated processing operation and the destination device being a device of a migration destination of the allocated processing operation. The method further including selecting as a processing operation of a migration target from among a plurality of processing operations allocated to the source device, a processing operation with which a rate that data used by the processing operation at the source device is to be used at the destination device is relatively high or higher than a predetermined rate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of an entire data management unit;

FIGS. 5A and 5B are diagrams explaining examples of migrations of processing and data;

FIG. 13 is a diagram illustrating an example of a hardware configuration of a management node.

DESCRIPTION OF EMBODIMENTS

When each of devices tries to distribute a load or a usage amount, a migration of data from the device to another device is performed. At this time, from the viewpoint of a local access, it is desirable that at the time of moving data, a set of processing and data is migrated between information processing devices. In this case, if the set of processing and data is simply migrated, the migration amount of data increase in some case. If the migration amount of data increases, a burden on a CPU or a network becomes high.

According to one aspect of an example to be discussed below, it is possible to migrate processing where the amount of data to be migrated is small.

Figure 1:
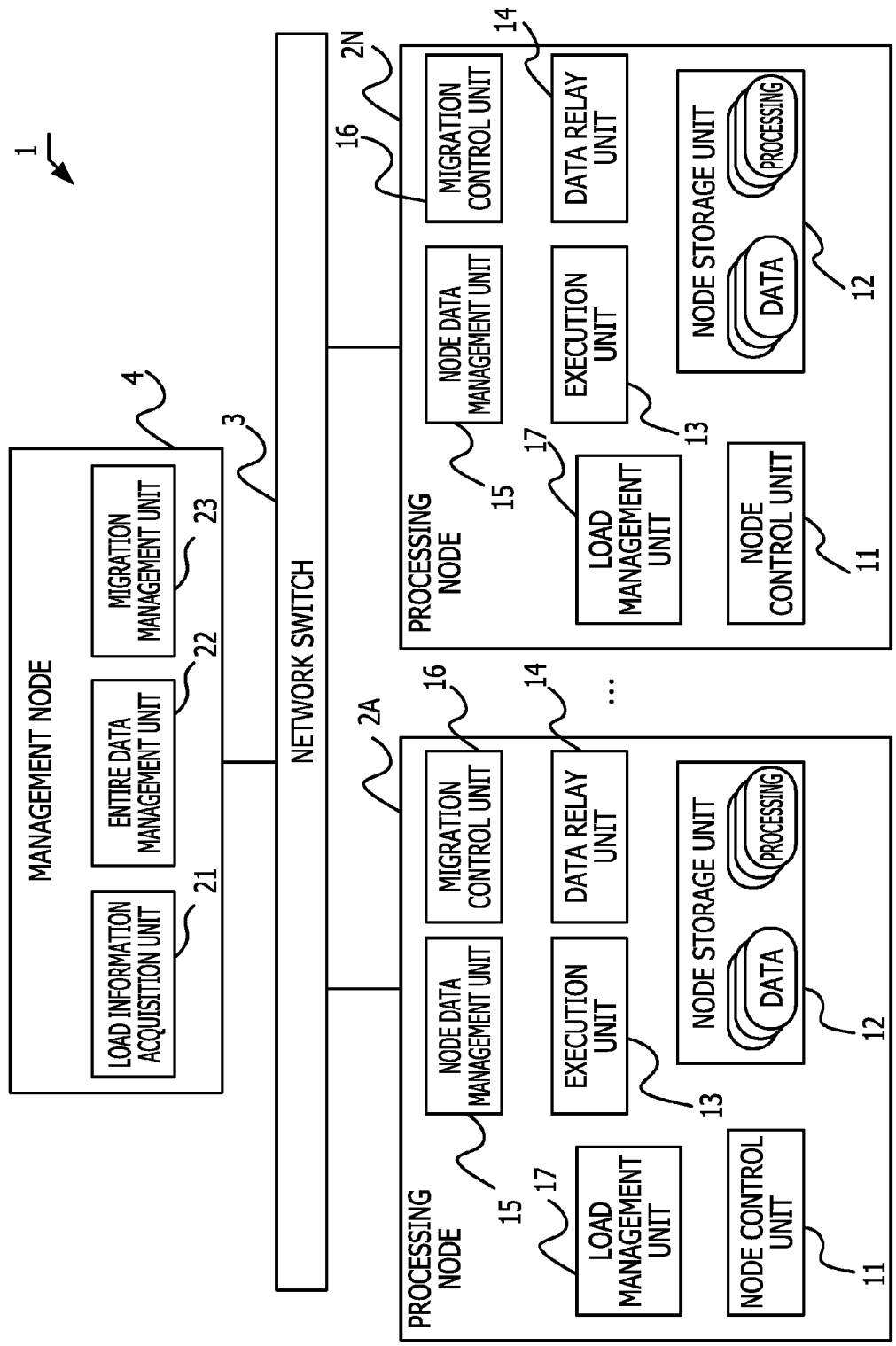
FIG. 1 is a block diagram illustrating an example of an entire configuration of a system.

FIG. 1 illustrates an example of the entire configuration of a system 1 to realize a distributed processing. The distributed processing may be a parallel distributed processing. The system 1 illustrated, as an example, in FIG. 1 includes a plurality of processing nodes 2A to 2N (hereinafter, collectively referred to as processing nodes 2 in some cases), a network switch 3, and a management node 4. In addition, the distributed processing may be batch processing or may be real-time processing.

The processing nodes 2 each execute allocated processing. The management node 4 manages the entire system 1. For example, a computer may be applied to each of the processing nodes 2 and the management node 4. The number of the processing nodes 2 is not limited to the example in FIG. 1. The management node 4 is an example of a control device.

Each of the processing nodes 2A to 2N and the management node 4 are able to perform communication with each other through the network switch 3. In addition, it is possible to perform communication between the processing nodes 2A to 2N through the network switch 3.

The processing nodes 2 will be described. The processing nodes 2 each include a node control unit 11, a node storage unit 12, an execution unit 13, a data relay unit 14, a node data management unit 15, a migration control unit 16, and a load monitoring unit 17. Each of the processing nodes 2 is an example of a device.

The node control unit 11 performs various control operations for the corresponding processing node 2. The node storage unit 12 stores therein processing and data. For example, in the processing stored in the node storage unit 12, a content to be performed by the processing is described. The data is used at the time of executing the processing. As an example, in a case where the processing is a query, the query performs various operations on the data.

One processing operation is executed using data. There is a case where the processing operation uses one piece of data, or there is a case where the processing operation uses a plurality of pieces of data. The execution unit 13 executes a processing operation stored in the node storage unit 12. When the processing operation is executed, a piece of data stored in the node storage unit 12 is used.

Figure 2:
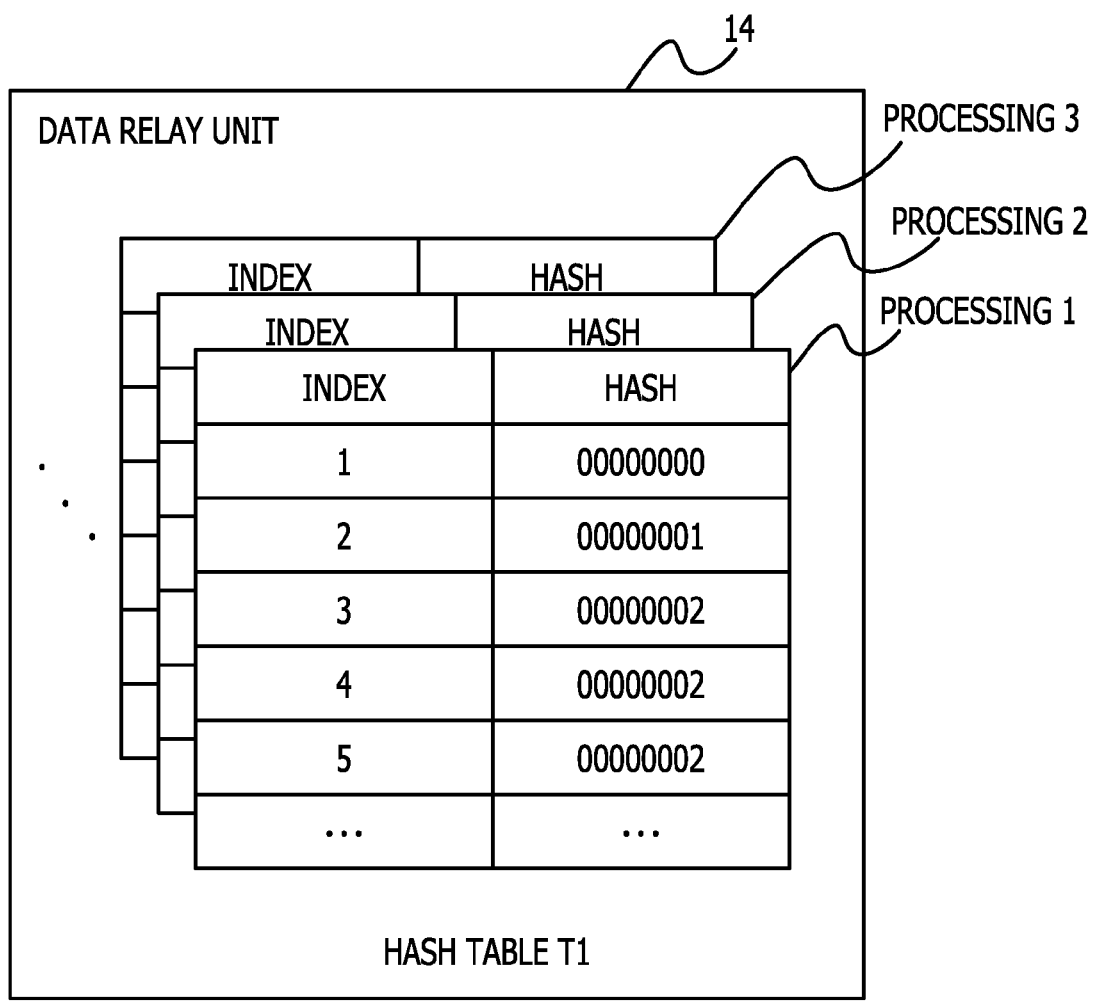
FIG. 2 is a diagram illustrating an example of a data relay unit.

As illustrated in the example in FIG. 2, the data relay unit 14 stores therein, for each index, the hash value of a piece of data stored in the node storage unit 12. In the embodiment, the data relay unit 14 relays processing stored in the node storage unit 12, to the node data management unit 15.

The data relay unit 14 includes a table for each processing operation. Hereinafter, this table is referred to as a hash table T1. The hash table T1 includes indexes and hashes. The hashes each indicate the hash value of data.

For example, the node control unit 11 may calculate the hash values of respective pieces of data stored in the node storage unit 12 and assign indexes to the respective calculated hash values. In addition, the node control unit 11 may store in the data relay unit 14, for respective processing operations.

In the example in FIG. 2, a processing operation 1 in the hash table T1 includes a plurality of hash values. One index is assigned to one hash value. Indexes have values incremented from "1". In the example in FIG. 2, indexes 1, 2, and 3 are different in the value of a hash value from one another. In other words, the indexes 1, 2, and 3 correspond to different pieces of data.

On the other hand, the hash values of indexes 4 and 5 are the same as that of the index 3. In other words, the indexes 3, 4, and 5 indicate the same data. In this case, since the processing operation 1 holds the same pieces of data, the overlapping indexes 4 and 5 may be deleted. From this, one index and one piece of data are associated with each other.

In the embodiment, hash values are used as values for identifying pieces of data. However, if being able to identify pieces of data, values other than the hash value may be used. In addition, the number of processing operations and the number of pieces of data may be arbitrary numbers. While, for example, in FIG. 2, three processing operation of the processing operation 1 to a processing operation 3 are exemplified, the number of processing operations is not limited to "3". In addition, while, in an example in FIG. 2, a case where the number of the hash values of the processing operation 1, in other words, the number of pieces of data, is "5" is exemplified, the number of pieces of data is not limited to "5".

In addition, while a case where information is managed in a table form is illustrated in the following example, the management of information is not limited to the table form. For example, in FIG. 2, examples of the table forms of the indexes and the hash values are exemplified. However, if being able to identify a relationship between indexes and hash values, the management of information is not limited to the table form.

In addition, while, in the example in FIG. 2, an index of a natural number is assigned to each hash value, it is possible to avoid being limited to indexes. For example, a key identified by an alphabet may be used in place of an index.

Figure 3:
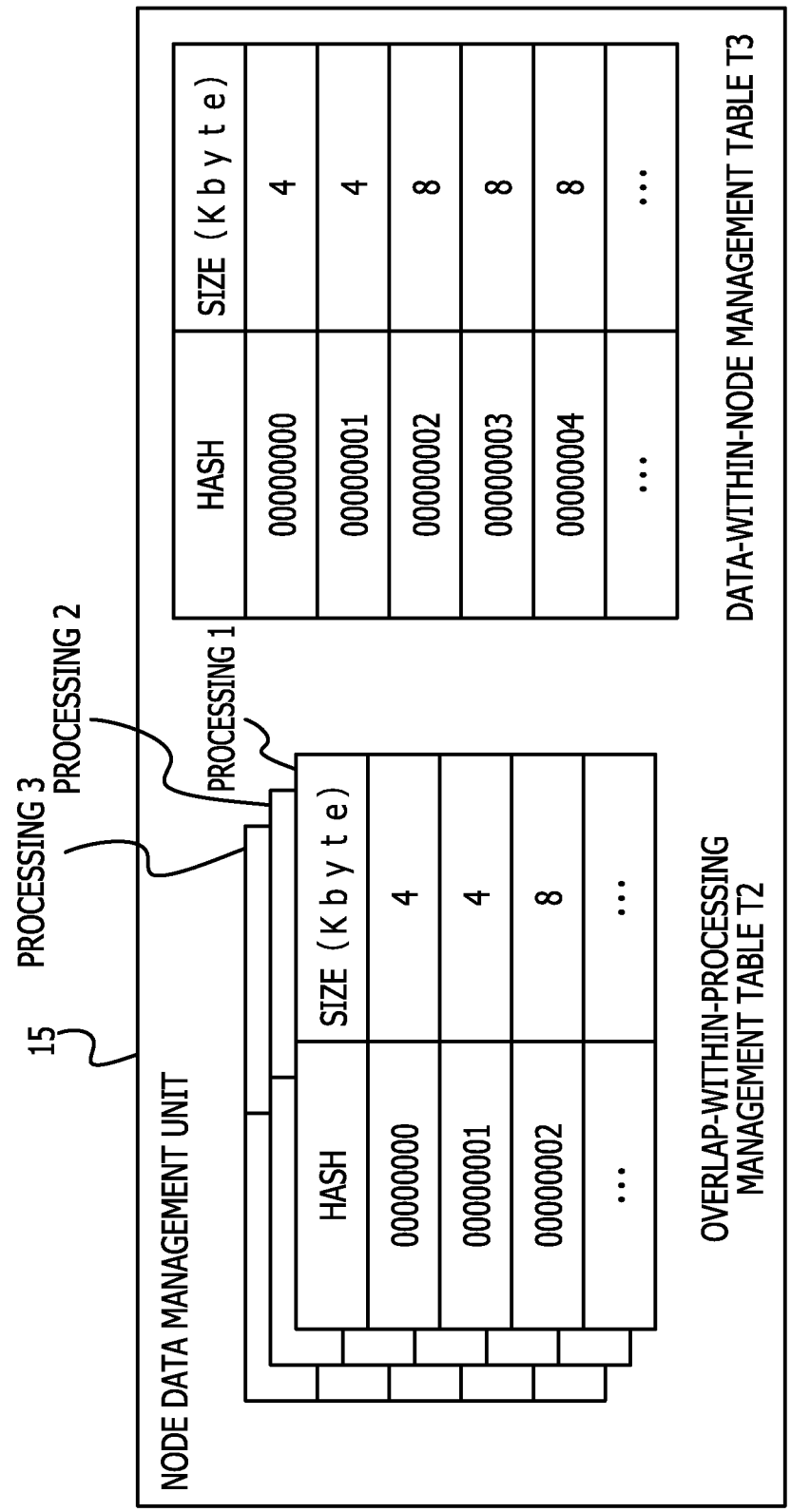
FIG. 3 is a diagram illustrating an example of a node data management unit.

The node data management unit 15 will be described. FIG. 3 illustrates an example of the node data management unit 15. The node data management unit 15 includes an overlap-within-processing management table T2 and a data-within-node management table T3.

The overlap-within-processing management table T2 stores therein a table for each processing operation. The tables each include hashes and sizes. The hashes are such hash values as described above. Each of the sizes is the size of data. In the example in FIG. 3, the unit of the size is (kilo byte: Kbyte)

In this regard, however, the size of data is not limited to the kilo byte.

A table for one processing operation in the overlap-within-processing management table T2 indicates data to be used by the relevant processing operation. In a case of the example in, for example, FIG. 3, the data size of data whose hash value is "00000000" is 4 kilo bytes, and the relevant data is used by the processing operation 1. Hereinafter, "data to be used by a processing operation" is referred to as "data to be executed by a processing operation" in some cases.

The data-within-node management table T3 stores therein, in a table form, a correspondence relationship between the hash value and the data size of each piece of data stored in the node storage unit 12 in the corresponding processing node 2. While the overlap-within-processing management table T2 is formed as a table for each processing operation, the data-within-node management table T3 is not formed as a table for each processing operation.

The migration control unit 16 transmits processing and data from the processing node 2 of itself to another processing node 2. The processing node 2 to serve as a migration destination and processing to serve as a migration target are given notice of by the management node 4, and the migration control unit 16 performs the migration control of the processing and data, based on this notice.

The load monitoring unit 17 monitors the load of the corresponding processing node 2. The load monitoring unit 17 may monitor the usage amount of the resource of the corresponding processing node 2. The load monitoring unit 17 may monitor, for example, the load of a central processing unit (CPU). Alternatively, the load monitoring unit 17 may monitor the usage amount of a resource such as a memory or a disk (for example, a hard disk drive).

Next, the management node 4 will be described. As illustrated in the example in FIG. 1, the management node 4 includes a load information acquisition unit 21, an entire data management unit 22, and a migration management unit 23. Through the network switch 3, the load information acquisition unit 21 acquires information relating to a load, from the load monitoring unit 17 in each processing node 2. Hereinafter, this information is referred to as load information. This load information may include the information of the usage amount of a memory or a disk. The load information acquisition unit 21 is an example of an acquisition unit.

The entire data management unit 22 manages overlap rates between all processing operations in all the processing nodes 2. FIG. 4 illustrates an example of the entire data management unit 22. The entire data management unit 22 illustrated, as an example, in FIG. 4 includes an overlap-between-processing-operation-and-node management table T4 and an overlaps-between-all-processing-operations management table T5. The overlap-between-processing-operation-and-node management table T4 is an example of a first table. The overlaps-between-all-processing-operations management table T5 is an example of a second table. In addition, the entire data management unit 22 is an example of a management unit.

The overlap-between-processing-operation-and-node management table T4 includes items of a processing operation and the overlap rate of data in a processing node. With respect to each combination of a processing operation and the corresponding processing node 2, the overlap-between-processing-operation-and-node management table T4 manages an overlap rate between data to be used by the processing operation and data stored by the corresponding processing node 2.

For example, the overlap rate may be indicated as "an overlap rate=(the total sum of the data sizes of pieces of data stored by a corresponding processing node and to be executed by a processing operation/the total sum of data sizes to be executed by the relevant processing operation)".

As for each processing operation, the management node 4 recognizes which of the processing nodes 2 the relevant processing operation is stored in. In addition, the management node 4 recognizes data to be executed by a processing operation. From all the processing nodes 2, the management node 4 may collect, for example, information relating to processing operations held therein and data to be executed by the relevant processing operations.

Accordingly, it is possible to obtain "the total sum of the data sizes of pieces of data stored by a corresponding processing node and to be executed by a processing operation", described above. In addition, it is possible for the entire data management unit 22 to obtain "the total sum of data sizes to be executed by the relevant processing operation".

Accordingly, it is possible for the entire data management unit 22 to obtain the overlap rate, based on the above-mentioned expression. The entire data management unit 22 manages the overlap rate for each combination of a processing operation and a node. From this, it is possible for the entire data management unit 22 to manage the overlap-between-processing-operation-and-node management table T4.

In the example in, for example, FIG. 4, the overlap rate between the processing operation 1 and a node A is 100%. In a case where the node A stores therein the processing operation 1 (alternatively, in a case where the processing operation 1 operates), the overlap rate between the processing operation 1 and the node A becomes 100%.

In addition, in the example in, for example, FIG. 4, the overlap rate between the processing operation 1 and a node B is 70%. This indicates that the overlap rate between data to be executed by the processing operation 1 and data stored by the node storage unit 12 in the node B is 70%.

Therefore, the node storage unit 12 in the node B turns out to store a sizable percentage of data held by the processing operation 1. On the other hand, since the overlap rate between the processing operation 1 and a node C is 44%, the overlap rate between data to be executed by the processing operation 1 and data stored by the node C is not so high.

The overlaps-between-all-processing-operations management table T5 includes items of a comparison reference processing operation, a comparison target processing operation, and an overlap rate. The comparison reference processing operation and the comparison target processing operation indicate two respective processing operations to be compared with each other. The overlap rate indicates a percentage of data overlapping between the processing operations to be compared with each other. A processing operation is associated with data to serve as a target of the relevant processing operation.

For example, the overlap rate may be indicated as "an overlap rate=(the total sum of the data sizes of pieces of data overlapping between the comparison reference processing operation and the comparison target processing operation)/(the total sum of the data sizes of pieces of data to be executed by the comparison reference processing operation)".

As described above, as for each processing operation, the management node 4 recognizes which of the processing nodes 2 the relevant processing is stored in. In addition, the management node 4 recognizes data to be executed by a processing operation.

Accordingly, it is possible for the entire data management unit 22 to obtain "the total sum of the data sizes of pieces of data overlapping between the comparison reference processing operation and the comparison target processing operation" and "the total sum of the data sizes of pieces of data to be executed by the comparison reference processing operation". In addition, for each combination of the comparison reference processing operation and the comparison target processing operation, it is possible for the entire data management unit 22 to obtain the overlap rate. From this, it is possible for the entire data management unit 22 to manage the overlaps-between-all-processing-operations management table T5.

In the example in FIG. 4, the overlap rate between the processing operation 1 and a processing operation 2 is 90%. In other words, the number of pieces of data overlapping between the processing operation 1 and the processing operation 2 is large. On the other hand, the overlap rate between the processing operation 1 and a processing operation 4 is 34%. Therefore, the number of pieces of data overlapping between the processing operation 1 and the processing operation 4 is not so large.

The migration management unit 23 manages the migrations of processing and data. Based on the entire data management unit 22, the migration management unit 23 identifies the processing node 2 of a migration source, the processing node 2 of a migration destination, and a processing operation to be migrated. Hereinafter, the processing node of a migration source is referred to as a migration source node in some cases. In addition, the processing node of a migration destination is referred to as a migration destination node in some cases. The migration source node is an example of a first device. The migration destination node is an example of a second device.

At the time of moving processing and data from the migration source node to the migration destination node, the migration management unit 23 identifies, as a migration target, a processing operation to reduce the amount of data to be migrated. Therefore, the migration management unit 23 identifies a processing operation to increase the overlap rate between data to be executed by the processing operation serving as a migration target and data stored by the migration destination node.

The migration management unit 23 notifies the migration source node of information relating to the migration destination node and the processing operation serving as a migration target. Hereinafter, this information is referred to as migration information in some cases. At this time, the migration management unit 23 may cause the migration information to include information relating to data to be moved along with the processing operation serving as a migration target.

Next, examples of the migrations of a processing operation and a node will be described with reference to FIGS. 5A and 5B. The migrations of a processing operation and a node are controlled by the migration management unit 23 in the management node 4. An example in FIG. 5A illustrates the three processing nodes 2 of the node A, the node B, and the node C. In the example in FIG. 5A, it is assumed that the node A is the migration source node.

The node storage unit 12 in the node A stores therein the processing operation 1. This processing operation 1 holds pieces of data D1, D2, D3, and D4. In other words, the processing operation 1 executes using the pieces of data D1 to D4. The pieces of data D1 to D4 are stored in the node storage unit 12 in the node A.

In the same way, the node storage unit 12 in the node B stores therein the processing operation 2. Pieces of data to serve as targets of the processing operation 2 are pieces of data D1, D2, D5, and D6, and these pieces of data are stored in the node storage unit 12 in the node B. In addition, the node storage unit 12 in the node C stores therein a processing operation 3. Pieces of data to serve as targets of the processing operation 3 are pieces of data D1, D7, D8, and D9, and these pieces of data are stored in the node storage unit 12 in the node C.

The examples in FIGS. 5A and 5B will be described under the assumption that the pieces of data D1 to D9 have the same data size. However the data sizes of the pieces of data D1 to D9 may be different from one another. The pieces of data D1 to D9 may be, for example, divided pieces of data obtained by dividing data blocks distributed to individual nodes.

In the examples in FIGS. 5A and 5B, as a node to serve as a destination to which the processing operation 1 is migrated from the node A, there are the node B and the node C. A processing operation and a piece of data are migrated so as to be placed in an environment enabling a local access, by the migration management unit 23. In addition, the migration management unit 23 migrates a processing operation and a piece of data so that the amount of data to be migrated is reduced.

The migration management unit 23 identifies a processing operation and a piece of data, which are to be migrated, with reference to the overlap-between-processing-operation-and-node management table T4 in the entire data management unit 22. At this time, the migration management unit 23 identifies a processing operation where the overlap rate between data held by the node of the migration destination and data to be executed is high.

The processing operation 1 uses the pieces of data D1, D2, D3, and D4. The node B stores therein the pieces of data D1, D2, D5, and D6. Accordingly, the overlap rate of data between the processing operation 1 and the node B becomes 50%. In the overlap-between-processing-operation-and-node management table T4 in the entire data management unit 22, it is stored that the overlap rate between the processing operation 1 and the node B is 50%.

The node C stores therein the pieces of data D1, D7, D8, and D9. Accordingly, the overlap rate between the processing operation 1 and the node C becomes 25%. In the overlap-between-processing-operation-and-node management table T4 in the entire data management unit 22, it is stored that the overlap rate between the processing operation 1 and the node B is 25%.

It is assumed that another processing operation exists in the node A in addition to the processing operation 1. In this regard, however, it is assumed that the combination of the processing operation 1 and the node B has the highest overlap rate among combinations of processing operations and nodes. Therefore, the migration management unit 23 identifies the processing operation 1 as a processing operation to be migrated. In addition, the migration management unit 23 identifies the node B as the migration destination node. In addition, the migration management unit 23 controls the node A so as to migrate the processing operation 1 to the node B.

At this time, as illustrated in FIG. 5B, the pieces of data D1 and D2 have already been stored in the node B. While data is migrated along with the processing operation 1, the pieces of data D1 and D2 have already been stored in the node B of the migration destination, and hence, the pieces of data D1 and D2 are allowed not to be migrated to the node B.

Therefore, the migration management unit 23 issues an instruction to the node A to migrate the data D3 and the data D4 to the node B with the processing operation 1 as the migration target. From this, the node A migrates the processing operation 1, the data D3, and the data D4 to the node B. At this time, the node A deletes the processing operation 1 from the node storage unit 12. In this case, it is possible to achieve the reduction of the resource of the node A.

The pieces of data D1 and D2 remain in the node storage unit 12 in the node A. These pieces of data D1 and D2 are pieces of data to be used by the processing operation 1. Therefore, if the other processing operation does not use the pieces of data D1 and D2, the node A is able to exclude (delete) the pieces of data D1 and D2 from the node storage unit 12.

Here, a case where the processing operation 1 is migrated from the node A to the node C is assumed. In the node C, the pieces of data D1, D7, D8, and D9 are stored. Accordingly, a piece of data stored in the node C and held by the processing operation 1 becomes only the data D1. Therefore, in a case where the processing operation 1 is migrated from the node A to the node C, it is desirable that the pieces of data D2, D3, and D4 are migrated.

Therefore, compared with a case of moving from the node A to the node B, the migration amount of data increases. Accordingly, the migration management unit 23 selects, as the migration destination node, a node where the overlap rate between data to be executed by a processing operation and data stored in a node of the migration destination is high.

From this, it is possible to reduce the amount of data to be migrated along with the processing operation 1.

Furthermore, the node B serving as the migration destination of the processing operation 1 stores therein the pieces of data D1, D2, D3, and D4. Therefore, the processing operation 1 is able to use the pieces of data D1, D2, D3, and D4 within the node B under the environment of local access. From this, it is possible to suppress the reduction of a processing speed.

Figure 6:
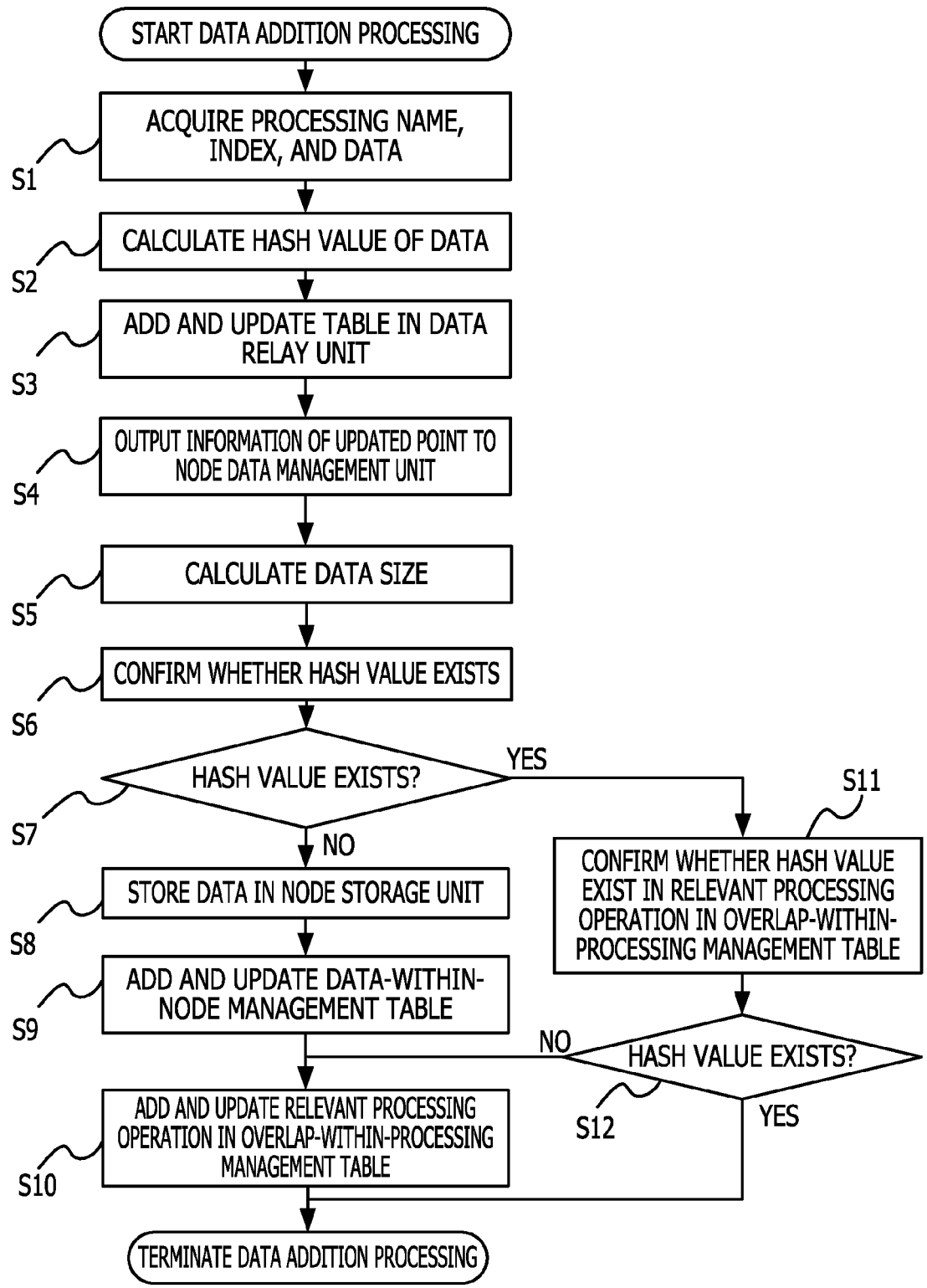
FIG. 6 is a flowchart illustrating an example of data addition processing.

Next, an example of processing in the embodiment will be described with reference to the flowcharts. FIG. 6 illustrates an example of a flow when a piece of data is added to the node storage unit 12 in one of the processing nodes 2. In the node storage unit 12, a piece of data is stored alone in some cases, and a piece of data is stored along with a processing operation in other cases.

From a processing operation to use a piece of data added and stored in the node storage unit 12, the data relay unit 14 acquires a processing name, an index, and the piece of data (step S1). In addition, in a case where a plurality of processing operations use the added piece of data, the data relay unit 14 acquires a processing name, an index, and a piece of data with respect to each of the processing operations.

The data relay unit 14 calculates the hash value of the acquired piece of data (step S2). This hash value is a hash value for identifying a piece of data added to the node storage unit 12. The data relay unit 14 assigns an index to the calculated hash value and stores the calculated hash value in the hash table T1 for a processing operation to use the piece of data (step S3).

The data relay unit 14 outputs, to a data management unit, information relating to an updated point (step S4). Hereinafter, the information relating to an updated point is referred to as updated point information. The updated point information includes a processing name, a hash value, and a piece of data. Based on an input piece of data, the node data management unit 15 calculates the data size of the relevant piece of data (step S5).

In addition, the node data management unit 15 confirms whether or not the hash value calculated in the step S2 exists in the data-within-node management table T3 (step S6). In a case where the hash value has already existed (YES in a step S7), the piece of data newly added and stored in the node storage unit 12 turns out to be already stored in the node storage unit 12. On the other hand, in a case where the hash value does not exist (NO in the step S7), the piece of data newly stored in the node storage unit 12 turns out not to be stored in the node storage unit 12.

In a case where the hash value does not exist, the added and stored piece of data is not stored in the node storage unit 12. Therefore, the node data management unit 15 stores the new piece of data in the node storage unit 12 (step S8).

Since the new piece of data is stored in the node storage unit 12, the node data management unit 15 performs updating for adding information within the data-within-node management table T3 (step S9). The hash value of the new piece of data is obtained from the step S2. In addition, the data size of the new piece of data is obtained from the step S5. Therefore, in the data-within-node management table T3, the node data management unit 15 stores the hash value and the data size of the new piece of data while associating the hash value and the data size of the new piece of data with each other.

In addition, the node data management unit 15 performs updating for adding the overlap-within-processing management table T2 (step S10). The node data management unit 15 has input a processing name to use the new piece of data.

Therefore, the node data management unit 15 performs updating for adding the hash value and the size of the new piece of data to a table corresponding to the input processing operation.

Next, data addition processing in a case where, in the step S7, it is determined that the hash value exists will be described. In this case, in the node storage unit 12, the data of the relevant hash value has already existed. Based on the input processing name, the node data management unit 15 confirms whether or not the hash value exists for the input processing name in the overlap-within-processing management table T2 (step S11).

In a case where the hash value exists (YES in a step S12), the overlap-within-processing management table T2 is allowed not to be updated, and thus, the data addition processing is terminated. On the other hand, in a case where the hash value does not exist (NO in the step S12), it is desirable that the overlap-within-processing management table T2 is updated.

Therefore, the flow shifts to the step S10. The node data management unit 15 stores the hash value and the data size of the new piece of data, in the table corresponding to the processing operation input from the data relay unit 14. In addition, the data addition processing is terminated.

Next, an example of a flow when a piece of data is deleted from the node storage unit 12 in one of the processing nodes 2 will be described with reference to FIG. 7. When a processing operation deletes a piece of data, the data relay unit 14 acquires, from the relevant processing operation, a processing name, an index, and the piece of data of a deletion target (step S21).

The data relay unit 14 performs updating for deleting the data (row) of the acquired index from a table of a processing operation corresponding to the acquired processing name (step S22). The data relay unit 14 outputs updated point information to the node data management unit 15 (step S23). This information includes the processing name and a hash value.

The node data management unit 15 performs updating for deleting the data (row) of the relevant hash value of the relevant processing operation in the overlap-within-processing management table T2 (step S24). The node data management unit 15 identifies, based on the input processing name, a processing operation used by the piece of data of a deletion target and deletes the input hash value from the overlap-within-processing management table T2.

The node data management unit 15 confirms whether or not the hash value to be deleted exists in another processing operation in the overlap-within-processing management table T2 (step S25). There is a case where a plurality of processing operations are stored in the node storage unit 12 in one of the processing nodes 2. In this case, data that one processing operation intends to delete may be used by another processing operation. In this case, if the piece of data is deleted, it is difficult for the other processing operation to use the piece of data under the environment of local access.

Therefore, in a case where, as a result of the confirmation in the step S25, the same hash value exists in the table of the other processing operation in the overlap-within-processing management table T2 (step S26), the node data management unit 15 does not delete the piece of data. In other words, in a case where the determination in the step S26 is YES, the node data management unit 15 does not allow the piece of data to be deleted.

On the other hand, in a case where the determination in the step S26 is NO, the node data management unit 15 deletes the data (row) of the relevant hash value from the data-within-node management unit (step S27). In addition, the node data management unit 15 deletes the piece of data from the node storage unit 12 (step S28). From the above, the data deletion processing is terminated.

Figure 8:
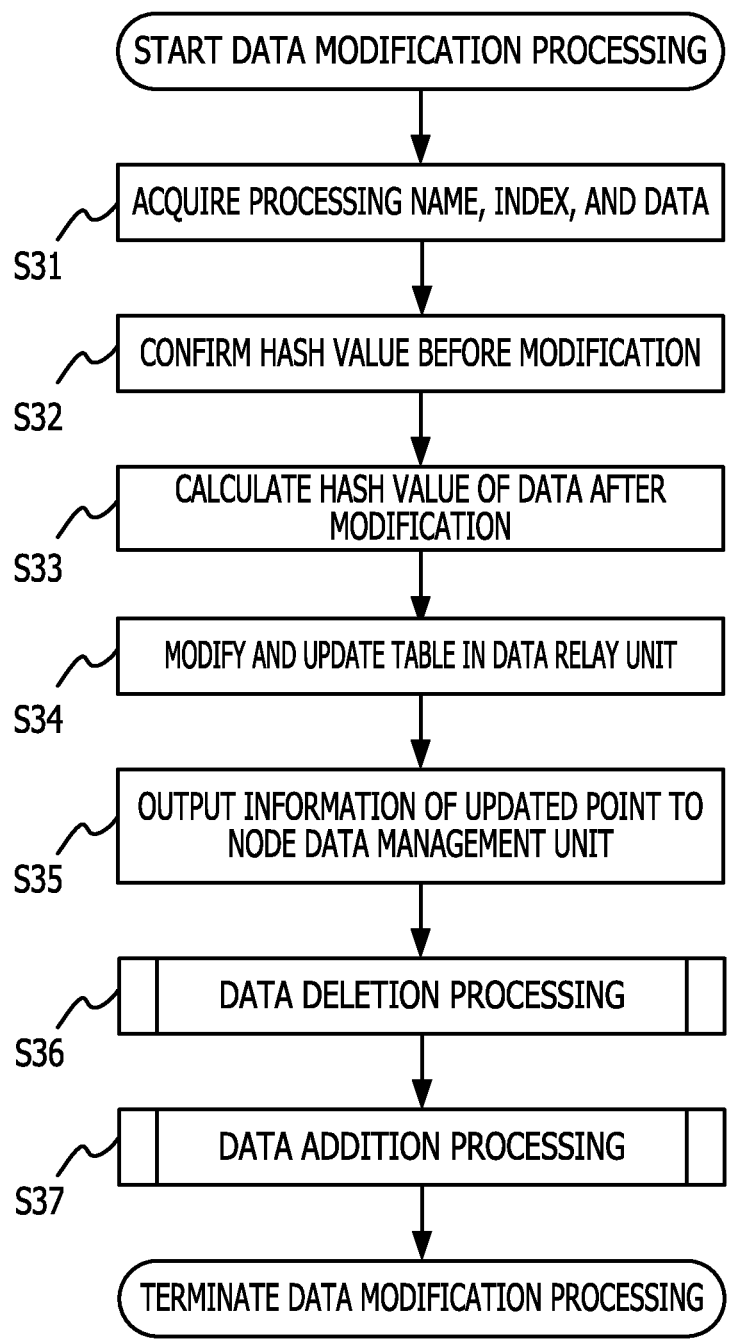
FIG. 8 is a flowchart illustrating an example of data modification processing.

Next, an example of a flow when a piece of data stored in the node storage unit 12 in one of the processing nodes 2 is modified will be described with reference to FIG. 8. When a processing operation performs modification of data, the data relay unit 14 acquires a processing name, an index, and the piece of data of a modification target, from the relevant processing operation (step S31).

The data relay unit 14 acquires the index of the piece of data of a modification target, from the processing operation. The data relay unit 14 confirms a hash value before modification, which corresponds to the relevant index (step S32).

The data relay unit 14 calculates the hash value of a piece of data after the piece of data of a modification target is modified (step S33). When the execution unit 13 executes, for example, a processing operation, the data relay unit 14 may acquire a modification content requested by the relevant processing operation, and the data relay unit 14 may calculate the hash value of the piece of data after the modification, based on the acquired modification content.

The data relay unit 14 stores the hash value after the modification and the index in the hash table T1 while associating the hash value after the modification and the index with each other (step S34). In addition, the data relay unit 14 outputs updated point information to the node data management unit 15 (step S35). The updated point information includes the processing name of the processing operation to be modified, the hash value before the modification, obtained in the step S32, the hash value after the modification, obtained in the step S33, and the piece of data after the modification.

Figure 7:
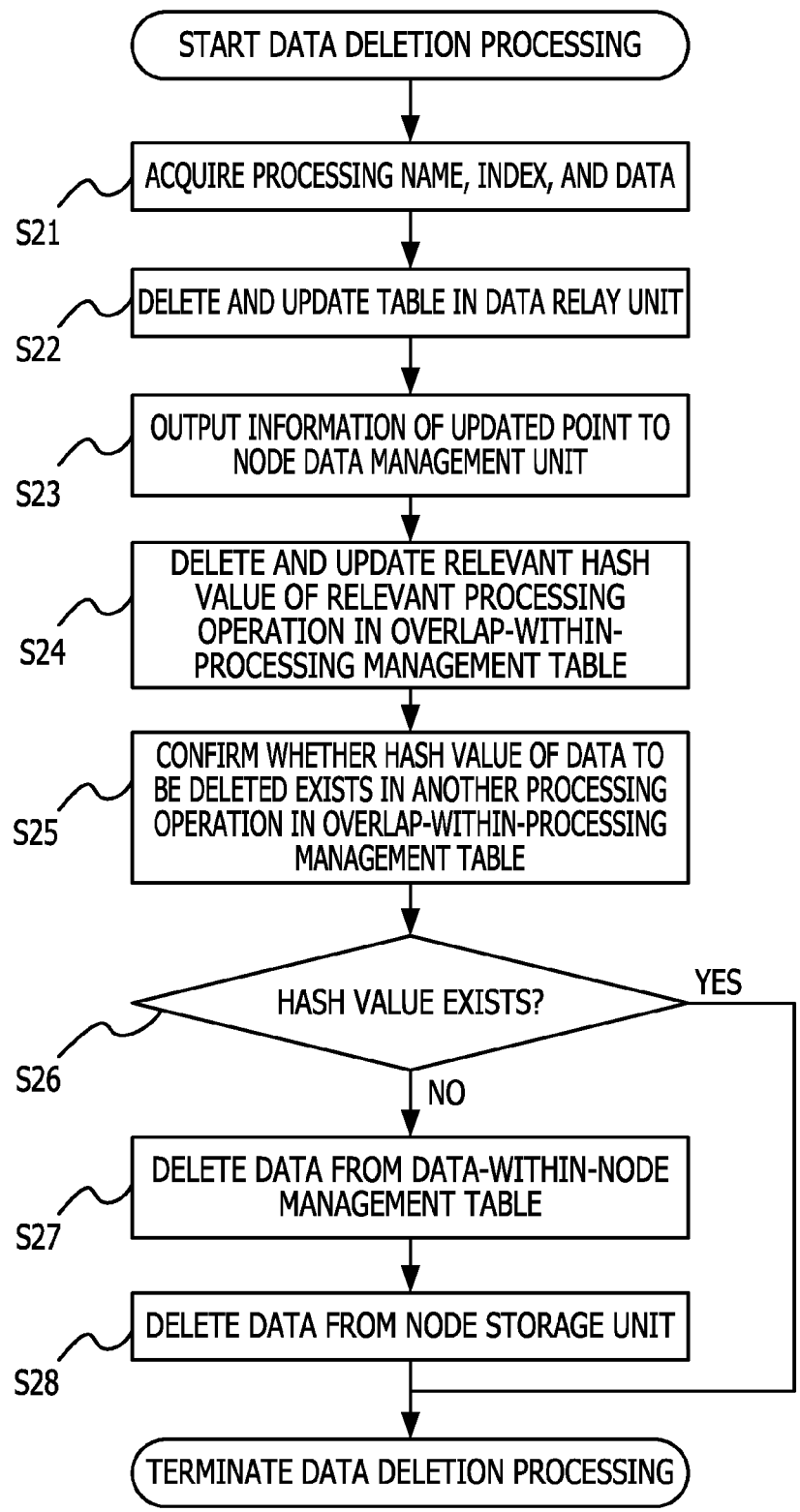
FIG. 7 is a flowchart illustrating an example of data deletion processing.

After inputting the updated point information from the data relay unit 14, the node data management unit 15 performs the data deletion processing illustrated in FIG. 7 (step S36). From this, the piece of data after the modification is deleted from the node storage unit 12.

In the same way, information relating to the piece of data before the modification is deleted from the hash table T1 in the data relay unit 14. In addition, information relating to the piece of data before the modification is deleted from the overlap-within-processing management table T2 and the data-within-node management table T3 in the node data management unit 15.

Next, the node data management unit 15 performs the data addition processing illustrated in FIG. 6 (step S37). From this, the piece of data after the modification is stored in the node storage unit 12. In the same way, information relating to the piece of data after the modification is stored in the hash table T1 in the data relay unit 14. In addition, information relating to the piece of data after the modification is stored in the overlap-within-processing management table T2 and the data-within-node management table T3 in the node data management unit 15.

Accordingly, the data deletion processing for deleting the piece of data before the modification is performed, and after that, the data addition processing for adding the piece of data after the modification is performed, thereby enabling the node data management unit 15 to perform processing for modifying data.

Next, a flow of migration processing for a processing operation and a piece of data, performed by the management node 4, will be described with reference to FIG. 9 and FIG. 10. The load information acquisition unit 21 in the management node 4 acquires load information from the load monitoring unit 17 in each of the processing nodes 2 (step S41). This load information is referred to as metrics in some cases.

Here, the lower limit threshold value and the upper limit threshold value of the load information will be described. The load information indicates the load of the corresponding processing node 2, and it is desirable that one of the processing nodes 2, whose load is high, reduces the load. In a case where, for example, the load of a processing operation executed in one of the processing nodes 2 is high, the processing capacity of the relevant processing node 2 is reduced.

Accordingly, in a case where the load of one of the processing nodes 2 is high, it is desirable that the load of the relevant processing node 2 is distributed to another processing node 2. Therefore, in a case where a value indicated by the load information exceeds the upper limit threshold value, the migration management unit 23 sends a notice of moving a processing operation and a piece of data to another processing node 2, to one of the processing nodes 2, whose load is high.

The upper limit threshold value may be arbitrarily set. That the load of one of the processing nodes 2 is, for example, 70% to 80% may be set as the upper limit threshold value. This upper limit threshold value may be preliminarily set in the migration management unit 23. The upper limit threshold value is an example of a first criterion.

On the other hand, one of the processing nodes 2 whose load is low is allowed not to migrate a processing operation and a piece of data. In a case where the load of one of the processing nodes 2 is very low, deleting the relevant processing node 2 from the system 1 does not influence the operation of the system 1, in some cases.

Therefore, from the viewpoint of reducing the usage amounts of the hardware resources of the entire system 1, in a case where the load of one of the processing nodes 2 is very low, the relevant processing node 2 may be deleted. Therefore, in a case where a value indicated by the load information is less than the lower limit threshold value, one of the processing nodes 2 whose load is very low is deleted.

At this time, the migration management unit 23 notifies the processing node 2 of a deletion target of an instruction to perform processing associated with deletion of the relevant processing node 2. The lower limit threshold value may be arbitrarily set. That the load of one of the processing nodes 2 is, for example, about 20% may be set as the lower limit threshold value.

The lower limit threshold value may be set to a value where the load is the first criterion or falls below the first criterion. The lower limit threshold value is an example of a second criterion. This lower limit threshold value may be preliminarily set in the migration management unit 23.

Figure 9:
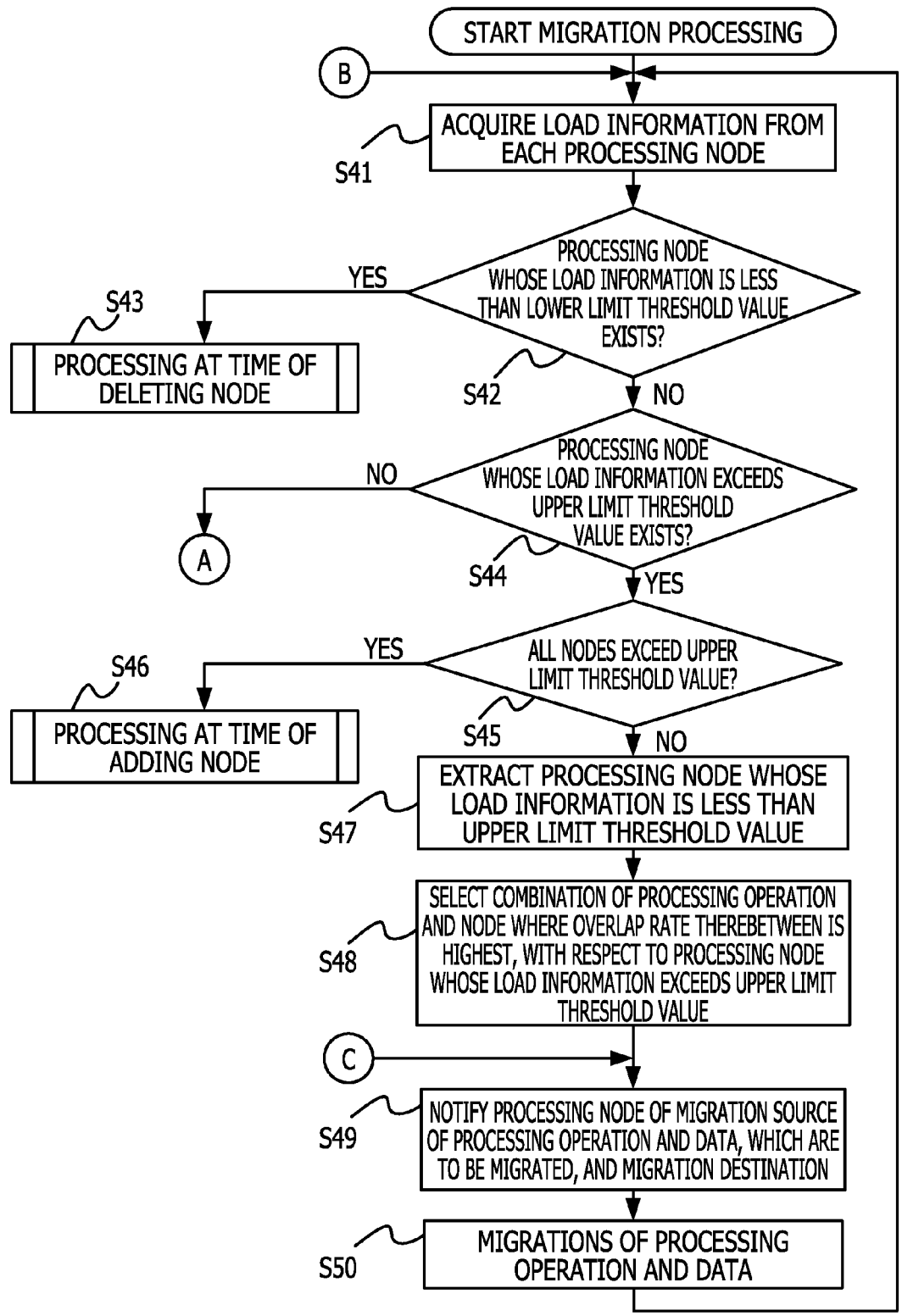
FIG. 9 is a flowchart illustrating one half of an example of migration processing.

As illustrated in FIG. 9, the migration management unit 23 determines whether or not one of the processing nodes 2, whose load is less than the lower limit threshold value, exists within the load information acquired by the load information acquisition unit 21 (step S42). In a case where one of the processing nodes 2, whose load is less than the lower limit threshold value, exists (YES in the step S42), processing at the time of deleting a node is performed (step S43). The processing at the time of deleting a node will be described later.

On the other hand, in a case of being determined as NO in the step S42, the load of each processing node 2 turns out to be greater than or equal to the lower limit threshold value. Accordingly, deletion of one of the processing nodes 2 is not performed. Next, the migration management unit 23 determines whether or not one of the processing nodes 2, whose load exceeds the upper limit threshold value, exists within the load information acquired by the load information acquisition unit 21 (step S44).

In a case where one of the processing nodes 2, whose load exceeds the upper limit threshold value, does not exist (NO in the step S44), the processing proceeds to a flow of "A" illustrated in FIG. 9. In a case where the step S42 is NO and the step S44 is NO, the load of each processing node 2 is less than or equal to the upper limit threshold value and greater than or equal to the lower limit threshold value. In other words, one of the processing nodes 2 is allowed not to be added, and one of the processing nodes 2 is allowed not to be deleted.

In a case of being determined as YES in the step S44, the load of one of the individual processing nodes 2 exceeds the upper limit threshold value. Based on the load information acquired by the load information acquisition unit 21, the migration management unit 23 determines whether or not the loads of all the processing nodes 2 in the system 1 exceed the upper limit threshold value (step S45).

In a case where all the processing nodes 2 exceed the upper limit threshold value, it is desirable that one of the processing nodes 2 is added. Therefore, in a case of YES in the step S45, processing at the time of adding a node is performed (step S46). The processing at the time of adding a node will be described later.

In a case of being determined as NO in the step S45, the load of one processing node 2 out of the individual processing nodes 2 exceeds the upper limit threshold value, but the loads of all the processing nodes 2 do not exceed the upper limit threshold value. Accordingly, one of the processing nodes 2, whose load does not exceed the upper limit threshold value, is detected.

In a case of being determined as NO in the step S45, the migration management unit 23 extracts one of the processing nodes 2, whose load is less than the upper limit threshold value (step S47). Since the load of the extracted processing node 2 is less than the upper limit threshold value, the extracted processing node 2 has room for a load.

The processing node 2 extracted in the step S47 becomes the migration destination node of a processing operation and a piece of data. There is a case where the number of the migration destination nodes is one, and there is a case where the number of the migration destination nodes is two or more. With respect to one of the processing nodes 2 whose load exceeds the upper limit threshold value, the migration management unit 23 selects a combination of a processing operation and a migration candidate node where the overlap rate therebetween is the highest (step S48).

Therefore, the migration management unit 23 references the entire data management unit 22. The entire data management unit 22 includes the overlap-between-processing-operation-and-node management table T4. As described above, the overlap-between-processing-operation-and-node management table T4 indicates an overlap rate between data to be executed by a processing operation and data stored by one of the processing nodes 2.

In the example in, for example, FIG. 4, it is assumed that the load information of the node A exceeds the upper limit threshold value and the load information of each of the node B and the node C is less than the upper limit threshold value. In this case, the processing node 2 of a migration source is the node A. In addition, a migration destination node is the node B or the node C.

Here, it is assumed that, among migration destination nodes and processing operations, a processing operation where the overlap rate of data is the highest is the combination of the processing operation 1 and the node B. In the example in FIG. 4, the combination of the processing operation 1 and the node B corresponds to 70%.

Accordingly, the migration management unit 23 identifies the processing node 2 of a migration source as the node A, identifies the processing node 2 of a migration destination as the node B, and identifies a processing operation to be moved as the processing operation 1. In addition, the migration management unit 23 notifies the node A serving as the processing node 2 of a migration source of the node B serving as the processing node 2 of a migration destination and the processing operation 1 serving as the processing operation to be migrated (step S49).

The migration control unit 16 in the node A that receives this notice migrates the processing operation 1 and a piece of data. In this regard, however, a piece of data that overlaps with the node B of a migration destination is not migrated. In the example in FIG. 4, the overlap rate between the processing operation 1 and the node B is 70%. Therefore, since many pieces of data overlap between the processing operation 1 and the node B, the amount of data to be migrated becomes small.

In addition, since pieces of data overlapping with the node B of a migration destination are not migrated, the relevant pieces of data remain in the node A. In a case where the remaining pieces of data are not used by another processing operation in the node A, the node A may delete the remaining pieces of data.

As described above, a node whose load information exceeds the upper limit threshold value is defined as a migration source node, and a processing operation is migrated to a node whose load information is less than or equal to the upper limit threshold value, thereby reducing the load of the migration source node.

At this time, since a processing operation whose overlap rate with data stored by the migration destination node is the highest is selected as a target of a migration, it is possible to migrate a processing operation where the amount of data to be migrated is small. In addition, since the migration destination node stores therein data to be used by the migrated processing operation, it is possible to maintain the environment of local access. Therefore, it is possible to suppress a reduction in a processing speed.

While, in the above-mentioned example, from among a plurality of processing operations allocated to the migration source, a processing operation where the overlap rate between data used by the processing operation and data stored by the migration destination node is the highest is selected as the target of a migration, the processing operation of a migration target is not limited to the processing operation whose overlap rate is the highest.

From among the plural processing operations allocated to the migration source node, a processing operation where a rate at which data used by the processing operation is used by the migration destination node is relatively high or higher than a predetermined rate may be defined as the migration target. The predetermined rate may be arbitrarily set.

If a rate at which data used by a processing operation to serve as the migration target is used by the migration destination node becomes relatively high, it is possible to reduce the amount of data to be migrated. In addition, even in a case where the rate at which the data used by the processing operation to serve as the migration target is used by the migration destination node is higher than the predetermined rate, it is possible to reduce the amount of data to be migrated.

In addition, while an example in which a node whose load exceeds the upper limit threshold value is defined as the migration source node has been described, a node whose load is relatively large may be defined as the migration source node. In addition, while a node whose load falls below the lower limit threshold value is defined as the migration destination node, a node whose load is relatively small may be defined as the migration destination node.

In the above, in a case where, in one of the processing nodes 2, the load information exceeds the upper limit threshold value, the migration management unit 23 controls the migrations of a processing operation and a piece of data. In other words, a case where the load information of one of the processing nodes 2 exceeds the upper limit threshold value serves as a trigger for the migrations of a processing operation and a piece of data.

On the other hand, regardless of the load information of each of the processing nodes 2, the migrations of a processing operation and a piece of data may be performed. Even in a case where, for example, all the pieces of load information of the processing nodes 2 do not exceed the upper limit threshold value, the migrations of a processing operation and a piece of data may be performed.

In the flow illustrated, as an example, in FIG. 9, in a case of being determined as NO in the step S44, in other words, all the pieces of load information of the processing nodes 2 are greater than or equal to the lower limit threshold value and less than or equal to the upper limit threshold value, the flow proceeds to "A".

Figure 10:
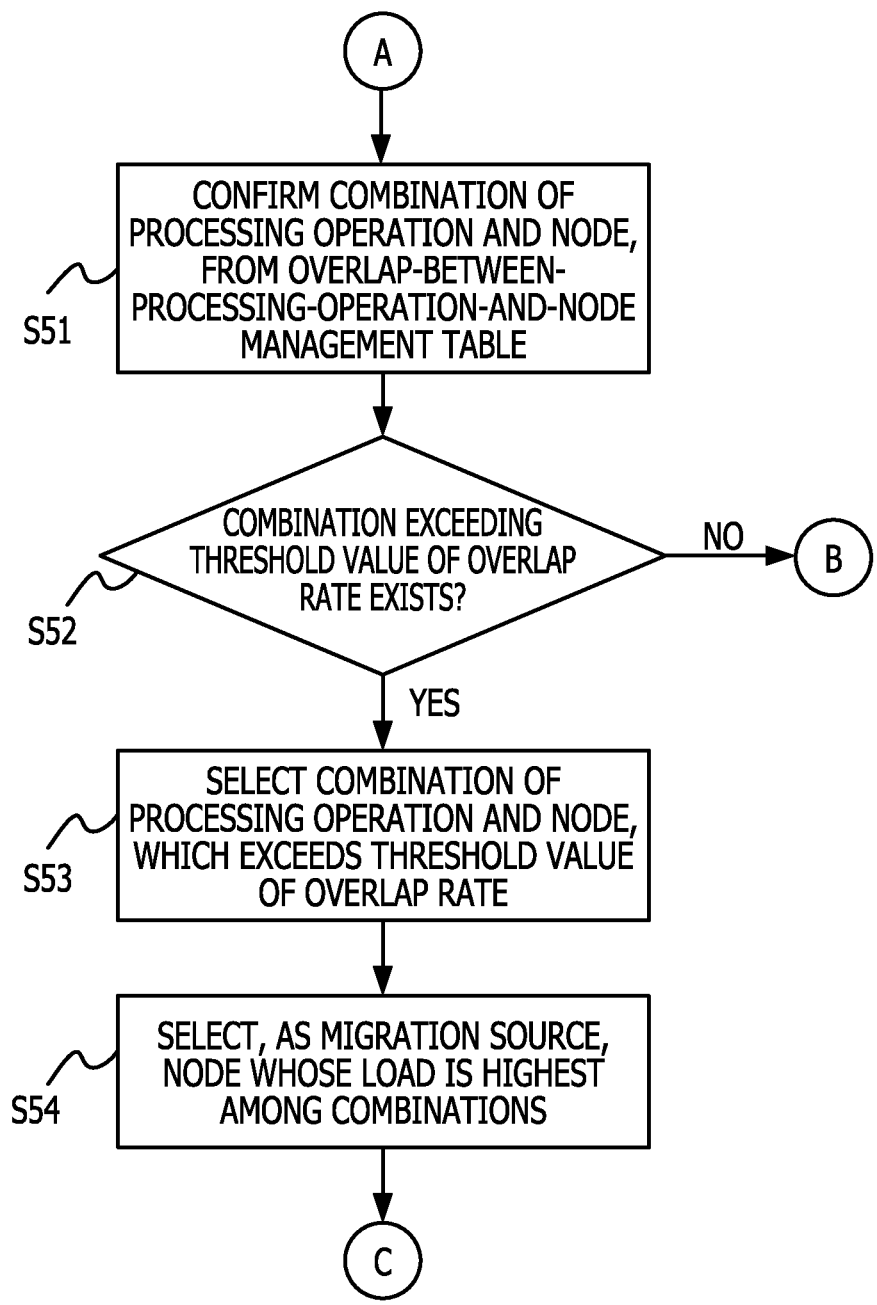
FIG. 10 is a flowchart illustrating the other half of the example of migration processing.

FIG. 10 illustrates an example of the flow after proceeding to "A". The migration management unit 23 confirms the combination of a processing operation and a node with reference to the overlap-between-processing-operation-and-node management table T4 (step S51). The overlap-between-processing-operation-and-node management table T4 stores therein all the combinations of processing operations and nodes. In addition, the overlap-between-processing-operation-and-node management table T4 stores therein an overlap rate for each combination.

In the migration management unit 23, the threshold value of the overlap rate may be preliminarily set. The threshold value of the overlap rate may be set to an arbitrary value. The migration management unit 23 determines whether or not a combination exceeding the threshold value of the overlap rate exists (step S52). If no combination exceeding the threshold value of the overlap rate exists (NO in the step S52), the flow proceeds to "B". In other words, the flow proceeds to the step S41 in FIG. 9.

On the other hand, in a case where a combination exceeding the threshold value of the overlap rate exists (YES in the step S52), the migration management unit 23 selects the combination of a processing operation and a node, which exceeds the threshold value of the overlap rate (step S53). The processing operation is a processing operation to serve as a migration target and the node becomes a migration destination node, within the combinations of processing operations and nodes. There is a case where the number of the selected combinations is two or more, and there is a case where the number of the selected combinations is one.

In a case where the number of the combinations selected by the migration management unit 23 is two or more, a node where the load information of the node to serve as the migration source is the highest among the combinations is selected (step S54). The migration management unit 23 recognizes which of the processing nodes 2 each of processing operations is a processing operation stored in.

Accordingly, the migration management unit 23 acquires, from the load information acquisition unit 21, the load information of one of the processing nodes 2 in which a processing operation out of the above-mentioned processing operations of the combinations is stored. In addition, one of the processing nodes 2 where the acquired load information is the highest is selected as the migration source node. In addition, in a case where the number of the combinations is one, the node of the combination is selected as the migration source node.

This step S54 is executed in a case where the determination of the step S44 in FIG. 9 is NO. In other words, the load information of each processing node 2 is less than or equal to the upper limit threshold value. Therefore, in many cases, a stable operation is performed as the entire system 1.

At this time, in the step S54, a node whose load information is the highest among the combinations of processing operations and nodes is selected as the migration source, and a processing operation and a piece of data are migrated. From this, by moving a processing operation and a piece of data before the load information exceeds the threshold value in one of the processing nodes 2, it becomes easy to reduce the occurrence of one of the processing nodes 2 whose load information exceeds the upper limit threshold value.

In this regard, however, in a case where a node whose load information is high is randomly defined as the migration source and a processing operation and a piece of data are migrated, even if the migration amount of data is small, a burden due to the migrations of the processing operation and the piece of data becomes large. Therefore, in a case where a combination exceeding the threshold value of the overlap rate exists (YES in the step S52), a processing operation and a piece of data are migrated, thereby enabling undesirable migrations of a processing operation and a piece of data to be suppressed.

At a time when the step S54 is executed, the migration source node, the migration destination node, and the processing operation to be migrated are identified. In addition, the flow shifts from "C" to the step S49 in FIG. 9. In the step S49, the migration management unit 23 notifies the processing node 2 of the migration source of the processing node 2 of the migration destination along with a processing operation and a piece of data, which are to serve as migration targets. In addition, in a step S50, the migrations of a processing operation and a piece of data are performed.

Accordingly, even in a case where the load information does not exceed the upper limit threshold value, when the combination of a processing operation and a piece of data exceeds the threshold value of the overlap rate, the processing operation and the piece of data are migrated to one of the processing nodes 2, whose overlap rate is high. From this, it is possible to reduce the occurrence of one of the processing nodes 2, whose load information exceeds the upper limit threshold value.

In other words, based on the overlap rate of a piece of data held between nodes, a node of the migration source and a node of the migration destination may be identified from among a plurality of nodes. In addition, from among processing operations allocated to the node of the migration source, a processing operation where a rate at which data used by the processing operation is used by the migration destination node is high or higher than a predetermined rate may be selected as a processing operation of the migration target. From this, it is possible to reduce the amount of data to be migrated.

Figure 11:
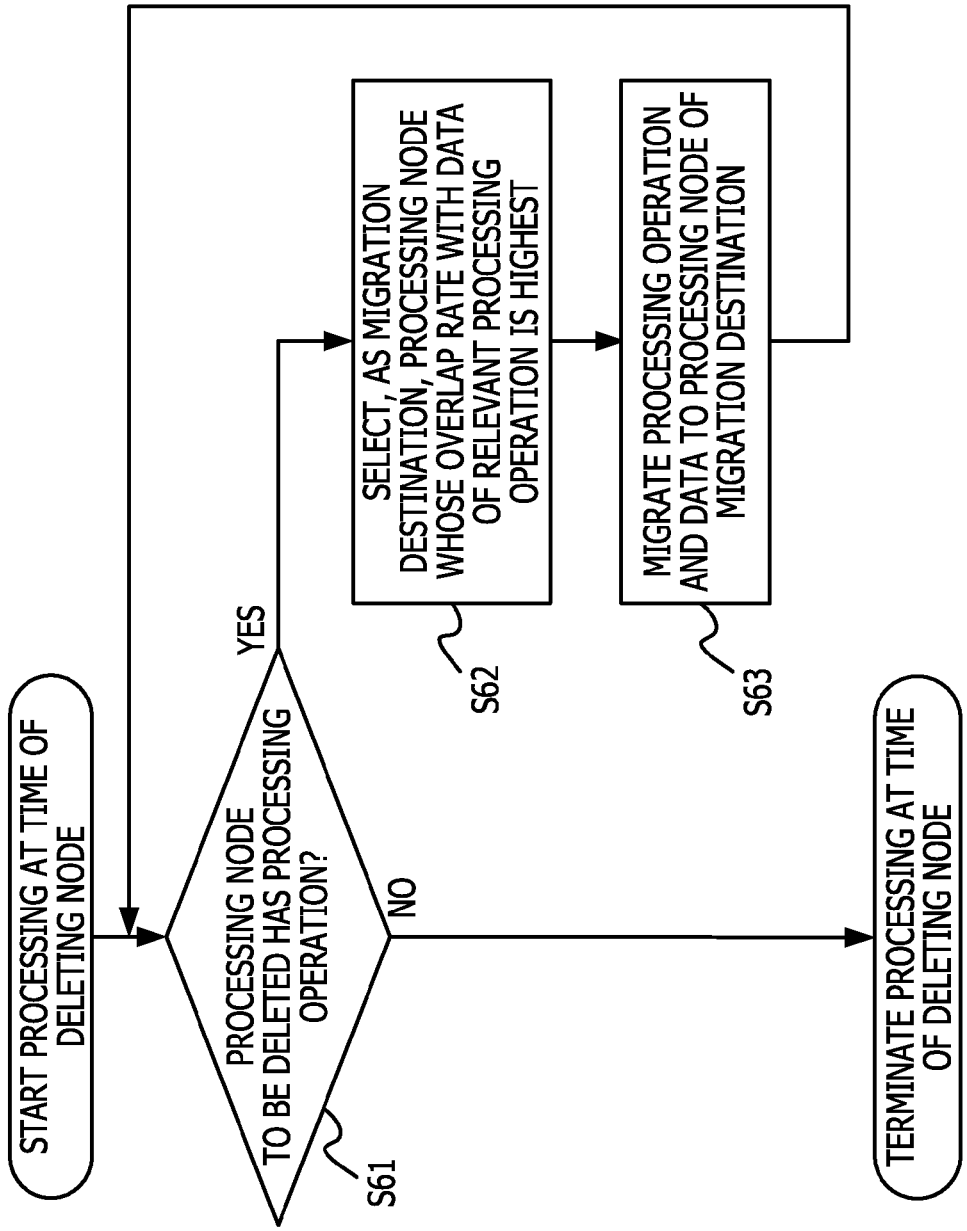
FIG. 11 is a flowchart illustrating an example of processing at the time of deleting a node.

Next, processing at the time of deleting a node in the step S43 in FIG. 9 will be described. FIG. 11 illustrates an example of a flow of the processing at the time of deleting a node. Before deleting one of the processing nodes 2, the migration management unit 23 determines whether or not the processing node 2 to be deleted has a processing operation (step S61). Since recognizing which of the processing nodes 2 each processing operation is stored in, the management node 4 is able to perform the determination in the step S61.

In a case where the processing node 2 to be deleted has a processing operation, it is desirable to migrate the relevant processing operation to another processing node 2. At this time, the migration management unit 23 selects, as a migration destination, one of the processing nodes 2, whose overlap rate with the data of the processing operation to be migrated is the highest (step S62). Since managing the overlap rate for each combination of a processing operation and a node using the overlap-between-processing-operation-and-node management table T4, the migration management unit 23 is able to select the migration destination.

In addition, the migration management unit 23 migrates a processing operation and a piece of data to the selected processing node 2 to serve as the migration destination. From this, since a processing node whose overlap rate of data is high is defined as the migration destination node, it is possible to reduce the amount of data to be migrated.

In addition, in the step S61, the migration management unit 23 determines whether or not the processing node 2 to be deleted has a processing operation. In a case where the processing node 2 to be deleted has a processing operation, the steps S62 and S63 are repeatedly performed until the processing node 2 to be deleted has no processing operation.

In addition, if no processing operation remains in the processing node 2 to be deleted (NO in the step S61), the processing at the time of deleting a node is terminated. From this, it becomes possible to delete one of the processing nodes 2, and the relevant processing node 2 is deleted.

Figure 12:
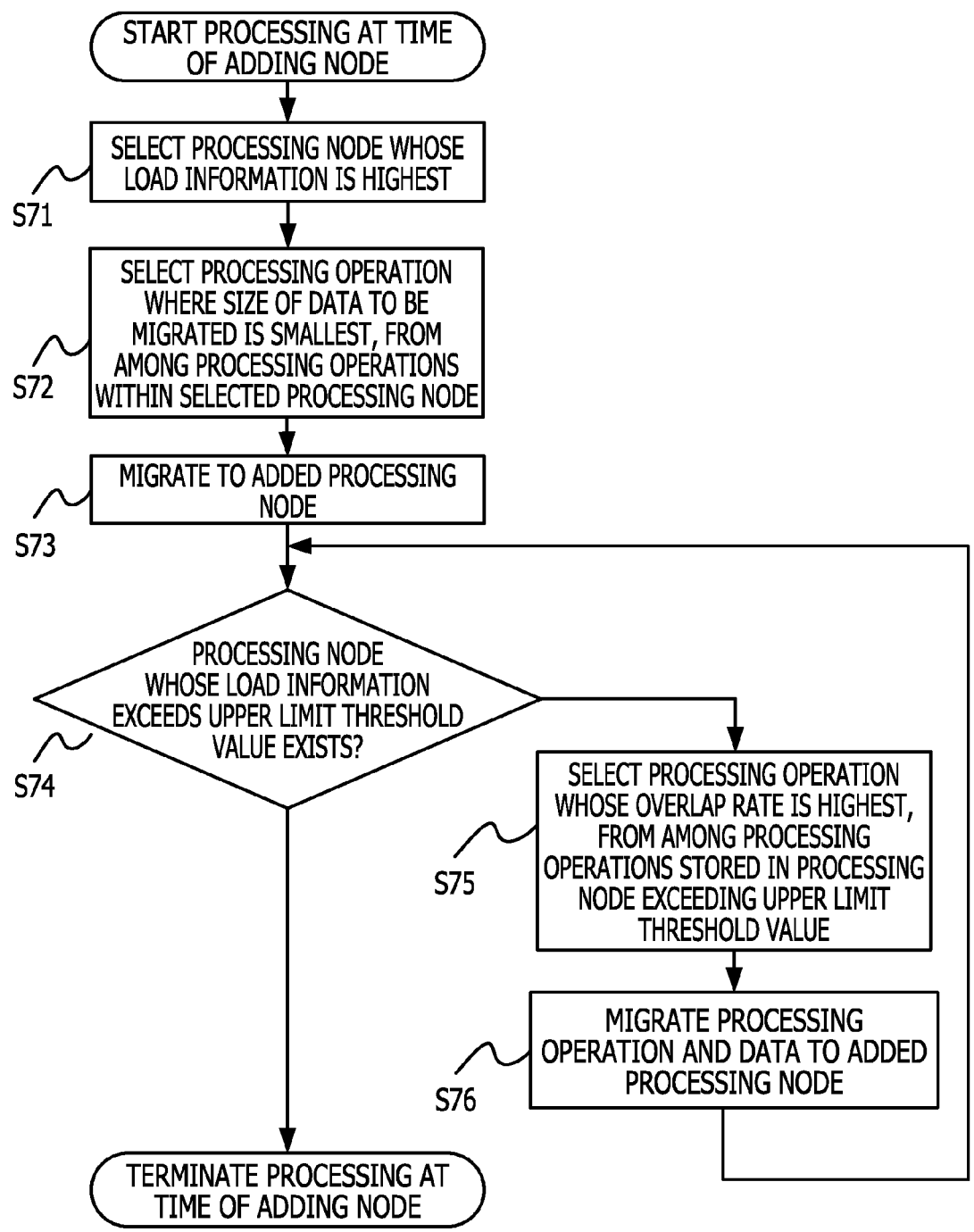
FIG. 12 is a flowchart illustrating an example of processing at the time of adding a node.

Next, processing at the time of adding a node in the step S46 will be described. FIG. 12 illustrates an example of a flow of the processing at the time of adding a node. The processing at the time of adding a node, illustrated, as an example, in FIG. 12, is processing after one of the processing nodes 2 is added to the system 1.

With reference to the load information acquisition unit 21, the migration management unit 23 selects one of the processing nodes 2, whose load information is the highest (step S71). In addition, the migration management unit 23 selects a processing operation where the size of data to be migrated is the smallest, from among processing operations within the selected processing node 2 (step S72). Since recognizing processing operations in the relevant processing node 2, the migration management unit 23 is able to select a processing operation where the size of data to be migrated is the smallest.

The migration management unit 23 defines, as s migration source node, the processing node 2 that is selected in the step S71 and whose load information is the highest, and identifies the added processing node 2 as a migration destination node. In addition, the migration management unit 23 identifies the processing operation selected in the step S72 and a piece of data used by the relevant processing operation.

In addition, the migration management unit 23 notifies the processing node 2 of the migration source node of an instruction to migrate the selected processing operation and data to the processing node 2 of the migration destination, in other words, the added processing node 2. From this, the processing node 2 of the migration source node migrates the processing operation and the piece of data to the processing node 2 given notice of (step S73).

With reference to the load information acquisition unit 21, the migration management unit 23 determines whether or not one of the processing nodes 2, whose load information exceeds the upper limit threshold value, exists (step S74). In a case where one of the processing nodes 2, whose load information exceeds the upper limit threshold value, exists (YES in the step S74), it is desirable to reduce the load of the relevant processing node 2.

Therefore, the migration management unit 23 selects a processing operation whose overlap rate is the highest, from among processing operations in the relevant processing node 2 exceeding the upper limit threshold value (step S75). The migration management unit 23 references the overlaps-between-all-processing-operations management table T5 in the entire data management unit 22. The overlaps-between-all-processing-operations management table T5 will be described.

As illustrated in the example in FIG. 4, the overlaps-between-all-processing-operations management table T5 indicates an overlap rate between a comparison reference processing operation and a comparison target processing operation. In other words, the overlaps-between-all-processing-operations management table T5 indicates the overlap rate of data used between the two processing operations. For example, in a case of the example in FIG. 4, the overlap rate of data used between the processing operation 1 and the processing operation 2 is 90%.

The migration management unit 23 identifies, as the migration source node, one of the processing nodes 2, whose load information exceeds the upper limit threshold value, and identifies the added processing node 2 as the migration destination node. In addition, the migration management unit 23 selects a processing operation where the overlap rate of data between a processing operation in the migration source node and a processing operation in the migration destination node is the highest.

In many cases, in an initial state, little processing is stored in the added processing node 2 serving as the migration destination node. For example, there is a possibility that no processing operation overlapping between the processing node 2 of the migration source node and the processing node 2 of the migration destination node exists.

In this case, within the processing node 2 of the migration source node, the migration management unit 23 may select, for example, a processing operation that increases the load of the relevant processing node 2. In addition, in such a manner as in the step S72, a processing operation where the size of data to be migrated is the smallest and a piece of data used by the relevant processing operation may be selected.

The migration management unit 23 notifies the processing node 2 of the migration source node of the migration destination node and a processing operation to be migrated. The processing node 2 of the migration source migrates, to the migration destination node given notice of, the processing operation and a piece of data to be used by the relevant processing operation (step S76). In addition, the flow shifts to the step S74.

The steps S75 and S76 are executed until determined as NO in the step S74. In other words, the steps S75 and S76 are repeated until no processing node 2 whose load information exceeds the upper limit threshold value remains. If determined as NO in the step S74, the processing at the time of adding a node is terminated.

If the steps S75 and S76 are executed, a processing operation and a piece of data are stored in the added processing node 2. Therefore, a processing operation where the overlap rate of data used by the relevant processing operation is the highest is selected in the step S75, thereby reducing the amount of data to be migrated.

Next, an example of the hardware configuration of the management node 4 will be described. As illustrated in an example in FIG. 13, in the management node 4, a processor 31, a random access memory (RAM) 32, a read only memory (ROM) 33, an auxiliary storage device 34, a communication interface 35, and a portable storage device connection unit 36 are connected to a bus 30.

The processor 31 is an arbitrary processing circuit such as a central processing unit (CPU). The processor 31 executes a program deployed in the RAM 32. As the program to be executed, a control program for realizing the processing of the embodiment may be applied. The ROM 33 is a non-volatile storage device storing therein the program to be deployed in the RAM 32.

The auxiliary storage device 34 is a storage device storing therein various kinds of information, and for example, a hard disk drive, a semiconductor memory, or the like may be applied to the auxiliary storage device 34. The communication interface 35 is an interface at the time of communicating with the outside.

The portable storage device connection unit 36 is provided so as to be connectable to the portable storage device 37. As the portable storage device 37, a portable memory, an optical disk (for example, a Compact Disk (CD) or a digital video disk (DVD), or the like) may be applied. The control program for performing the processing of the embodiment may be recorded in a computer-readable recording medium. In this case, the portable storage device 37 may be applied to the recording medium.

Each of the RAM 32, the ROM 33, and the auxiliary storage device 34 is an example of a computer-readable physical storage medium. These physical storage media are not transitory media such as signal carrier waves.

Within the management node 4, the load information acquisition unit 21, the entire data management unit 22, and the migration management unit 23 may be realized by, for example, a program executed in the processor 31. In addition, when each unit in the management node 4 performs communication, the communication interface 35 may be used. In addition, the information of the management node 4 may be stored in the auxiliary storage device 34, the RAM 32, or the like.

While, in the above, the migration destination node is extracted from among the processing nodes 2 less than the upper limit threshold value, a threshold value (hereinafter, referred to as a second threshold value) for extracting the migration destination node may be set to a value different from the upper limit threshold value. In this regard, however, the second threshold value is set to a value less than the upper limit threshold value.

For example, in a case where the upper limit threshold value is set to 90% of the load of each of the processing nodes 2, the second threshold value may be set to 70% of the load of each of the processing nodes 2. From this, it is possible to migrate a processing operation and a piece of data to one of the processing nodes 2, whose load is lower.

In addition, in a case where the processing nodes 2, which are lower than the second threshold value and whose number is two or more, are extracted, one of the processing nodes 2 where the overlap rate between the data of a processing operation and the data of a migration destination node is the highest is identified as the migration destination node. From this, it is possible to reduce the amount of data to be migrated along with the processing operation.

While the disclosed embodiments and the advantageous effects thereof have been described in detail, those skilled in the art may perform various modifications, additions, and omissions without departing from the scope of the present technology clearly described in the appended claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method for controlling a distributed processing system that performs distributed processing using a plurality of devices, the control method comprising:
   acquiring, by a processor, load information from each of the plurality of devices;
   identifying, by the processor, a source device and a destination device from the plurality of devices based on the acquired load information, the source device being a device of a migration source of an allocated processing operation, and the destination device being a device of a migration destination of the allocated processing operation; and
   selecting, by the processor, as a processing operation of a migration target from among a plurality of processing operations allocated to the source device, a processing operation with which a rate that data used by the processing operation at the source device is to be used at the destination device is higher than a predetermined rate,
   wherein the destination device is identified by identifying a device at which a rate of holding data which is the same as data used by the processing operation at the source device, is higher than a predetermined rate.

2. The method according to claim 1, wherein
   when a plurality of destination devices are identified as the destination device, the identifying selects, from among the plurality of destination devices, a device at which a rate of holding data which is same as data held by the source device is highest.

3. The method according to claim 1, wherein
   the identifying identifies, from the plurality of devices, the source device by identifying a device at which the acquired load is higher than a predetermined threshold, and identifies the destination device by identifying a device at which the acquired load is than the predetermined threshold.

4. The method according to claim 1, wherein
   the identifying identifies the source device by identifying a device at which the acquired load exceeds a first criterion, and identifies the destination device by identifying a device at which the acquired load is less than or equal to the first criterion or a second criterion falling below the first criterion.

5. The method according to claim 1, wherein
   when is the plurality of devices includes a specific device with which the load information exceeds the first criterion, the selecting of the processing operation of the migration target selects, as the processing operation of the migration target from among a plurality of processing operations allocated to the specific device, a processing operation with which a rate that data used by the processing operation at the specific device is to be used at the destination device is higher than a predetermined rate.

6. The method according to claim 1, wherein
when data executed by the processing operation selected as the migration target remains in the source device after the processing operation of the migration target is migrated to the destination device, the data remained in the source device is deleted when another processing operation does not use the data remained in the source device.

7. A control method for controlling a distributed processing system that performs distributed processing using a plurality of devices, the control method comprising:
identifying, by a processor, a source device and a destination device based on an overlap rate of data held between devices out of the plurality of devices, the source device being a device of a migration source, and the destination device being a device of a migration destination; and
selecting, by the processor, as a processing operation of a migration target from among processing operations allocated to the source device, a processing operation with which a rate that data used by the processing operation at the source device is to be used at the destination device is higher than a predetermined rate,
wherein the destination device is identified by identifying a device at which a rate of holding data which is the same as data used by the processing operation at the source device, is higher than a predetermined rate.

8. The method according to claim 6, wherein
when load information of all the devices in the system does not exceed a threshold value of the load information, identification of the migration target is performed.

9. The method according to claim 6, wherein
a device whose load is the highest among the plurality of devices is identified as the source device.

10. A distributed processing system comprising:
a plurality of devices each of which performs a processing operation; and
a control device, wherein the control device includes:
  a memory; and
  a processor coupled to the memory and configured to:
    acquire load information from each of the plurality of devices; and
    identify a source device and a destination device from the plurality of devices based on the acquired load information, the source device being a device of a migration source of an allocated processing operation, and the destination device being a device of a migration destination of the allocated processing operation, and
    select, as a processing operation of the migration target from among a plurality of processing operations allocated to the source device, a processing operation with which a rate that data used by the processing operation at the source device is to be used at the destination device is higher than a predetermined rate,
    wherein the destination device is identified by identifying a device at which a rate of holding data which is the same as data used by the processing operation at the source device, is higher than a predetermined rate.

11. The distributed processing system according to claim 10, wherein
the processor is configured to select, when a plurality of destination devices are identified as the destination device, from among the plurality of destination devices, a device at which a rate of holding data which is same as data held by the source device is held is highest.

12. The distributed processing system according to claim 10, wherein
the processor is configured to
identify, from the plurality of devices, the source device by identifying a device at which the acquired load is higher than a predetermined threshold, and identifies the destination device by identifying a device at which the acquired load is lower than a predetermined threshold, in the identification of the source device and the identification of the destination device.

13. The distributed processing system according to claim 10, wherein
the processor is configured to
identify the source device by identifying a device at which the acquired load exceeds a first criterion, and identifies the destination device by identifying a device at which the acquired load is less than or equal to the first criterion or a second criterion falling below the first criterion, in the identification of the source device and the identification of the destination device.

14. The distributed processing system according to claim 10, wherein
the processor is configured to select, when the plurality of devices includes a specific device with which the load information exceeds the first criterion, as the processing operation of the migration target from among a plurality of processing operations allocated to the specific device, a processing operation with which a rate that data used by the processing operation at the specific device is to be used at the destination device is higher than a predetermined rate, in the selection of the processing operation of the migration target.

15. The distributed processing system according to claim 10, wherein
when data executed by the processing operation selected as the migration target remains in the source device after the processing operation of the migration target is migrated to the destination device, the data remained in the source device is deleted when another processing operation does not use the data remained in the source device.

* * * * *